United States Patent Office 2,858,278
Patented Oct. 28, 1958

2,858,278

TEST TABLET

Walter A. Compton, Dale E. Fonner, and Galen F. Collins, Elkhart, Ind., assignors to Miles Laboratories, Inc., Elkhart, Ind., a corporation of Indiana No Drawing. Application January 12, 1955
Serial No. 481,478

5 Claims. (Cl. 252—408)

This invention relates to a test tablet for the determination of sugar in fluids.

The testing techniques heretofore used for the determination of reducing sugars in fluids, such as in urine for example, have been based on the use of reagent media in the form of either liquids, powders, or effervescent tablets. Liquid reagent preparations and those of the effervescent tablet type although effective, sensitive and reliable possess the shortcoming that the testing techniques based thereon require a certain amount of equipment and some degree of technical training and skill on the part of the technician performing the determinations, for their success. For example, liquid reagents require an external source of heat, test tubes, measuring containers and the like. The known, and widely utilized test based on the use of an alkaline copper salt-containing effervescent tablet likewise requires the use of test tubes and measuring devices. And with both of these techniques a certain amount of operational skill is necessary, as already mentioned, to make the measurements, dilutions and so on.

Testing techniques based on the use of various reagents in the form of powders have a great disadvantage in at least one respect, namely that it is difficult to obtain therewith reliable and clear differentations between positive and negative specimens of urine.

While a number of the foregoing tests are important, useful and fill a definite need for certain kinds of sugar determination tests, particularly where a high degree of sensitivity is required, there has been and continues to be a real need for a sugar test suitable for the rapid "screening" of urine samples which could be performed by personnel having a minimum amount of technical skill (and equipment).

The present invention is directed to such a test and makes use of a diagnostic composition in the form of a stable compressed tablet which requires of the operator only the ability to distinguish between obvious color differences effected when a drop of the fluid to be tested is placed on the surface of the tablet. We are aware that powdered compositions of one kind or another have been suggested for use in sugar determinations, and that an advantage of such powdered compositions is that the equipment requirements are at a minimum, needing only the deposition of a drop or two of the fluid onto the powdered mixture. However, the disadvantages associated with tests based on the use of such powders far outweigh the aforesaid advantages. Thus, powders to which the fluid to be tested is added present an uncontrolled and uneven surface for reading or color observation. With powders it is extremely difficult to obtain a consistent unit amount; this is important since if too small an amount of the mixed powders is used "flooding" will occur thereby rendering the test insensitive and unreliable. Furthermore, powdered compositions heretofore suggested do not result in the presentation of a uniform color when the fluid being tested is "negative"; for example, with prior art powders "negative urines" may give a color varying from white to various other colors. Illustratively, with powder compositions of the prior art which contain bismuth salts the color resulting from the addition of "negative" urines to the powder may vary from light yellow to a deep rose color. While the reason for such color variations is not clearly understood, apparently there are some constituents in the urine other than those which will reduce bismuth which provide, in the presence of the other powder constituents, these "foreign" color shades. Another disadvantages of the use of powders of the prior art is that the moisture which is absorbed from the atmosphere by the powder, as by storage or by exposure to high humidity conditions, may render the powder useless as a diagnostic medium with no apparent indication that the product has thus become useless and unreliable.

The diagnostic tablets of our invention are signally free of the aforesaid deficiencies and have been found to be eminently suitable on the basis of reliability, simplicity, and speed, for use in those situations where, for example, vast numbers of urine specimens must be tested quickly, simply and inexpensively for the presence or the absence of pathologically significant amounts of sugar.

We have found that the incorporation of calcium sulfate or calcium oxide into a mixture of a bismuth salt and an alkali resulted in a product which, when used in tablet form for sugar determinations in accordance with the technique of our method, produced a uniform light tan color when sugar-negative urine specimens were tested. Without the presence in the tablet of a material such as calcium sulfate or calcium oxide, contacting the tablet with a sugar-negative urine specimen results in color variations on the surface of the tablet from white to a deep rose color.

The following examples which are set forth below and which are intended as typical and informative only and which are not to be construed in a limiting sense will further illustrate the invention.

*Example 1*

To 250 grams of dried calcium sulfate is added 100 cc. of water. After mixing, the mass is sifted through a screen, preferably a 6 to a 20 mesh screen. After drying at 190° F. overnight, the material which is in the form of lumps or granules is sifted through a #30-mesh screen. 541 grams of sodium hydroxide in the form of small granules having a particle size such that it goes through a 40 mesh and is held by an 80 mesh screen is then mixed with the aforesaid calcium sulfate. To the above is added 41 grams of NF powdered bismuth subnitrate containing one molecule of water.

The above mixture is then tableted in a conventional tableting machine to produce tablets about ⅜" in diameter, ⅛" thick, each tablet containing, based on the weight of the tablet, 30% of calcium sulfate (containing one half molecule of water of crystallization), 65% of sodium hydroxide, and 5% of bismuth subnitrate (containing one molecule of water of crystallization).

*Example 2*

The procedure described in Example 1 is followed except that the calcium sulfate is replaced by calcium oxide and the proportions of other ingredients are varied so that the resulting tablet contains 40% of calcium oxide, 55% of sodium hydroxide, and 5% of bismuth subnitrate.

While we have specified certain proportions of preferred ingredients which are useful to a greater or lesser degree in producing the tablets of our invention, these may be varied. We prefer, however, to use dried calcium sulfate, the amount of this material based on the weight of the resulting tablet, being from about 10% to 50%. The alkali content, preferably sodium hydroxide, may likewise vary from about 40% to about 80%. With respect to the bismuth subnitrate, enough of this material, or of an equivalent bismuth compound, must be used to react with the sugar which may be present in pathological specimens being tested.

In use, a drop or two of the urine specimen to be tested is placed on the surface of a tablet having the composition described in Examples 1 and 2, for example. With sugar-negative specimens an even light-tan color develops on the surface of the tablet. With sugar positive specimens, the resulting color will be uniformly a shade of gray-black.

Having described our invention, we claim:

1. A composition for determining the presence of reducing sugars in a liquid comprising, in intimate admixture in tablet form about 40% to 80% of sodium hydroxide, about 10% to 50% of calcium sulfate, and sufficient bismuth subnitrate to react with the reducing sugar in said liquid.

2. The composition of claim 1 wherein the bismuth subnitrate contains one molecule of water of crystallization.

3. A composition for determining the presence of reducing sugar in a liquid comprising, in intimate admixture in tablet form, about 40% to 80% of sodium hydroxide, about 10% to 50% of calcium sulfate containing water of crystallization, and sufficient bismuth subnitrate containing water of crystallization to react with the reducing sugar in said liquid.

4. A composition for determining the presence of reducing sugar in a liquid comprising, in intimate admixture in tablet form, about 40% to about 80% of a solid alkali, about 10% to about 50% of material selected from the group consisting of calcium sulfate and calcium oxide, and a quantity of a bismuth compound reducible by said reducing sugar in the presence of an alkali, said bismuth compound being present in an amount sufficient to react with the reducing sugar in said liquid.

5. A composition for determining the presence of reducing sugars in a liquid comprising, in intimate admixture in tablet form, about 40% to about 80% of sodium hydroxide, about 10% to about 50% of material selected from the group consisting of calcium sulfate and calcium oxide, and sufficient bismuth subnitrate to react with the reducing sugars in said liquid.

References Cited in the file of this patent

UNITED STATES PATENTS

| | | |
|---|---|---|
| 2,210,579 | Galat | Aug. 6, 1940 |
| 2,281,758 | Galat | May 5, 1942 |